(No Model.)
J. P. MAY.
HORSE DETACHER.
No. 259,567. Patented June 13, 1882.
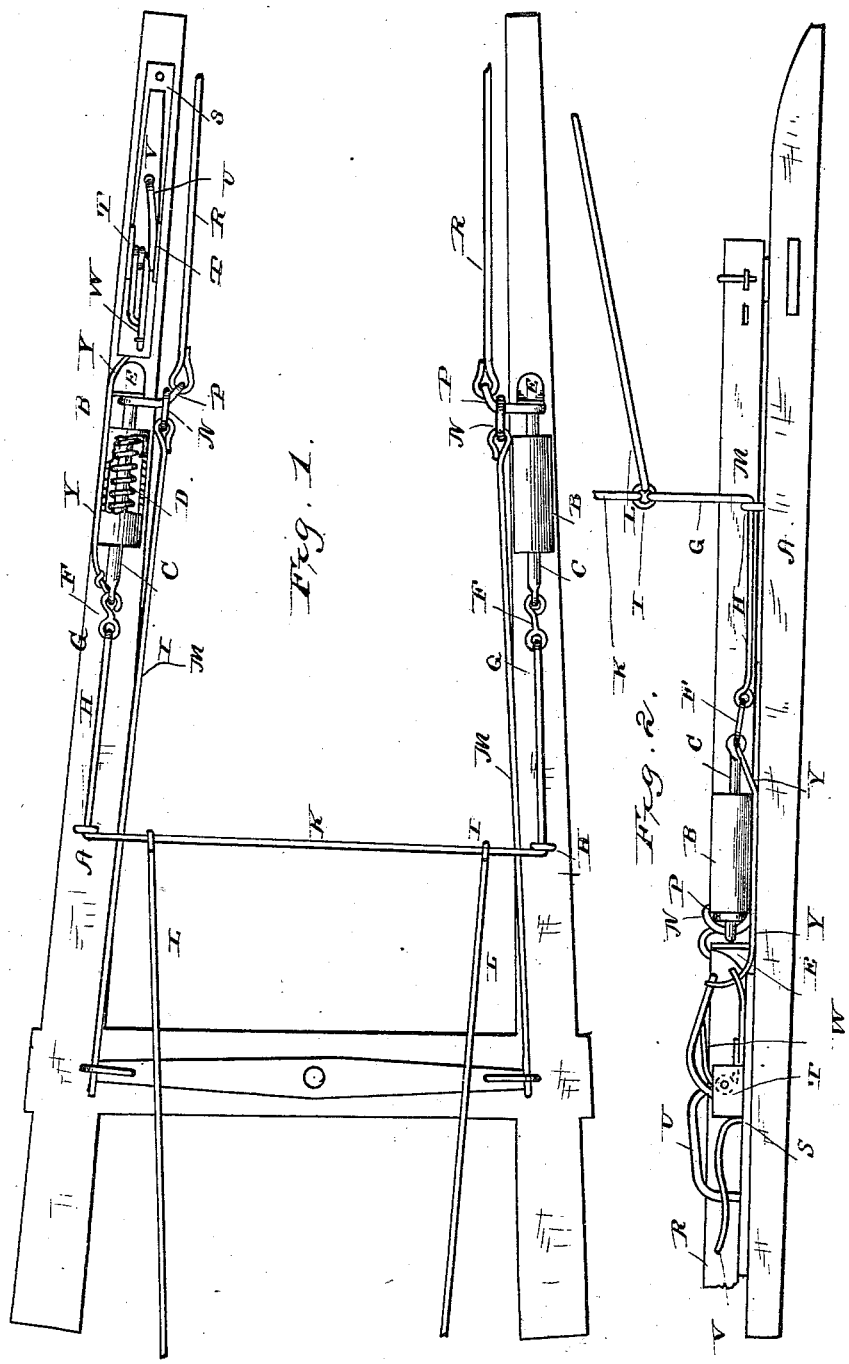
Witnesses.
Edwin L. Yencee.
H. Aubrey Toulmin
Inventor.
John P. May.
By E. M. Alexander Atty

UNITED STATES PATENT OFFICE.

JOHN P. MAY, OF TROY, ALABAMA.

HORSE-DETACHER.

SPECIFICATION forming part of Letters Patent No. 259,567, dated June 13, 1882.

Application filed April 4, 1882. (No model.)

*To all whom it may concern:*

Be it known that I, JOHN P. MAY, of Troy, in the county of Pike, and in the State of Alabama, have invented certain new and useful Improvements in Horse-Detachers; and I do hereby declare that the following is a full, clear, and exact description thereof, reference being had to the accompanying drawings, and to the letters of reference marked thereon, making a part of this specification.

This invention relates to certain improvements in harness and harness attachments; and it has for its objects to provide reliable means whereby the horse or other animal may be detached from the shafts and traces when the driver loses control of it, as more fully hereinafter specified. These objects I attain by the devices illustrated in the accompanying drawings, in which—

Figure 1 represents a top view of the shafts of a vehicle, showing my invention applied thereto; and Fig. 2, a side elevation of the same.

The letter A indicates the shafts of a vehicle, which are of the ordinary construction, and B two cylindrical casings, one secured to each shaft directly opposite each other. The said casings are provided with longitudinal bolts C, which are shouldered or provided with other convenient abutments near their forward ends, within the casings, against which the forward ends of the spiral springs D press, the rear ends bearing against the rear heads of the casings so as to force the bolts forward and cause them to bear against the abutments E. The rear ends of the bolts are provided with eyes, to which are connected the hooks F of the forward ends of the straps G, which pass backward through staples H, the rear ends being connected to the rings I, to which are also connected the straps K and L, one of which passes over the rump of the animal, the other extending back to the driver.

The letter M indicates the traces, which are secured to the whiffletree, as usual, the forward ends of which are provided with rings N, through which the bent eyes P of the straps R may be passed, the said eyes being adapted to be held and engaged by the sliding bolts before mentioned, as indicated in the drawings. The forward ends of the straps are to be attached to the hames of the harness.

The letter S indicates two metallic plates, one secured to each of the shafts just forward of the casings before mentioned. The said plates are provided with lugs T, between which are fulcrumed the levers U, the forward ends of which are bent downward and pass through apertures in the short tongues V, attached to the plates. The rear ends of the levers are pressed upward by means of the springs W, and are connected with the eyes of the sliding bolts by means of the cords or straps Y. The tug of the harness sets under this tongue, and is held therein by means of the forward bent end of the lever. This device may be employed alone in drays and wagons, the tug being secured to the tongue in the same manner as to the ordinary hook.

Having thus described my invention, what I claim, and desire to secure by Letters Patent, is—

1. In combination with the shafts, the cylindrical inclosed casings, and the straight sliding bolts and spiral springs, the straps connected to the eyes at the rear of the springs, and the hame-straps and traces, adapted to be held by the bolts and abutments on the shafts and to be released therefrom, substantially as specified.

2. In combination with the shafts, the plate and lever fulcrumed thereto, and the tongue adapted to hold the tug in connection with the lever, substantially as specified.

3. In combination with the shafts, the casings, and the sliding bolts and springs and their harness-connections, the plates and levers and the tongues to which the tugs are adapted to be attached, substantially as specified.

In testimony whereof I affix my signature, in presence of two witnesses, this 2d day of May, 1881.

JOHN P. MAY.

Witnesses:
 J. J. McCARTHY,
 CHAS. D. DAVIS.